US009847631B2

(12) United States Patent
Shotey et al.

(10) Patent No.: US 9,847,631 B2
(45) Date of Patent: *Dec. 19, 2017

(54) EXTENDABLE ELECTRICAL BOX

(71) Applicant: Hubbell Incorporated, Shelton, CT (US)

(72) Inventors: Marcus J. Shotey, Scottsdale, AZ (US); Jeffrey P. Baldwin, Phoenix, AZ (US); Richard L. Cleghorn, Tempe, AZ (US); John Klein, Gilbert, AZ (US); Thomas A. Miserendino, Gilbert, AZ (US)

(73) Assignee: Hubbell Incorporated, Shelton, CT (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/534,514

(22) Filed: Nov. 6, 2014

(65) Prior Publication Data

US 2015/0060441 A1 Mar. 5, 2015

Related U.S. Application Data

(62) Division of application No. 12/414,609, filed on Mar. 30, 2009, now Pat. No. 8,899,431.

(60) Provisional application No. 61/096,615, filed on Sep. 12, 2008.

(51) Int. Cl.
*H02G 3/08* (2006.01)
*B65D 21/08* (2006.01)

(52) U.S. Cl.
CPC .......... *H02G 3/081* (2013.01); *B65D 21/086* (2013.01); *H02G 3/086* (2013.01)

(58) Field of Classification Search
CPC .......... H02G 3/086; H02G 3/081; H02G 3/08; H05K 5/00; B65D 21/086
USPC ......... 220/3.7, 4.01–4.03, 8, 3.92, 3.94, 3.9, 220/3.3, 3.2; 174/50, 57, 559, 560, 561, 174/562, 520
See application file for complete search history.

(56) References Cited

U.S. PATENT DOCUMENTS

| 2,378,861 | A | | 6/1945 | Peevey | |
|---|---|---|---|---|---|
| 2,875,915 | A | * | 3/1959 | Buckels | H02G 3/126 220/3.7 |
| 3,622,029 | A | | 11/1971 | Ware | |
| 4,115,656 | A | | 9/1978 | Aitel | |
| 4,134,636 | A | * | 1/1979 | Kleinatland | H02G 3/123 174/58 |

(Continued)

*Primary Examiner* — J. Gregory Pickett
*Assistant Examiner* — Rafael Ortiz
(74) *Attorney, Agent, or Firm* — Dickinson Wright PLLC

(57) ABSTRACT

An extendable electrical box comprises an electrical box having two open ends to an internal box space having a first depth. The electrical box comprises a mounting structure attached to at least one wall of the electrical box. The mounting structure is configured to mount the electrical box to a vertical wall structure such that the open end faces substantially parallel to the vertical wall structure. At least two extendable first rings each continuously surround one of the two open ends of the electrical box. The at least two extendable first rings are each slidably coupled with the electrical box via the sliding mechanical cooperation of one or more guides with one or more tracks, such that sliding either of the at least two extendable first rings in relation to the open ends of the electrical box expands the electrical box from the first depth to a larger second depth.

13 Claims, 12 Drawing Sheets

(56) References Cited

U.S. PATENT DOCUMENTS

| | | | |
|---|---|---|---|
| 4,630,717 A * | 12/1986 | Tong | A45C 7/0031 |
| | | | 190/104 |
| 5,042,673 A | 8/1991 | McShane | |
| 5,289,934 A | 3/1994 | Smith et al. | |
| 5,839,594 A | 11/1998 | Barbour | |
| 5,975,323 A * | 11/1999 | Turan | H02G 3/086 |
| | | | 220/3.7 |
| 6,198,045 B1 * | 3/2001 | Roesch | H02G 3/126 |
| | | | 174/58 |
| 6,915,946 B2 | 7/2005 | Gosis et al. | |
| 7,396,996 B1 | 7/2008 | Shotey et al. | |
| 2005/0051546 A1 | 3/2005 | Dinh | |

* cited by examiner

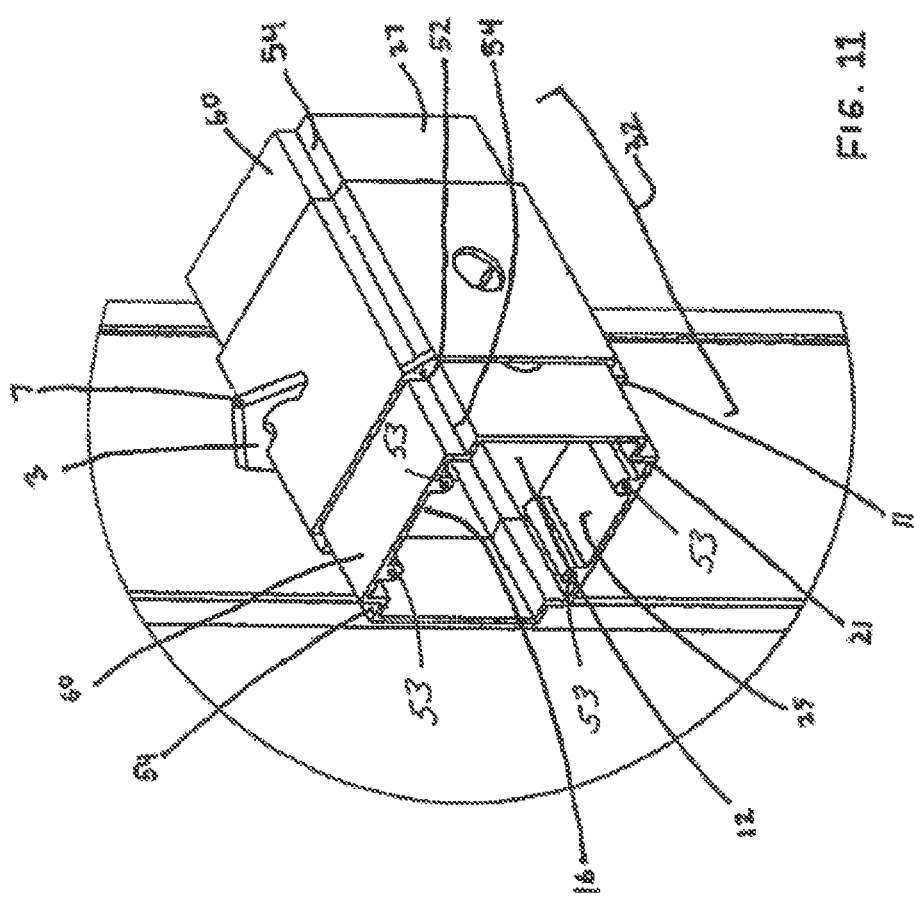

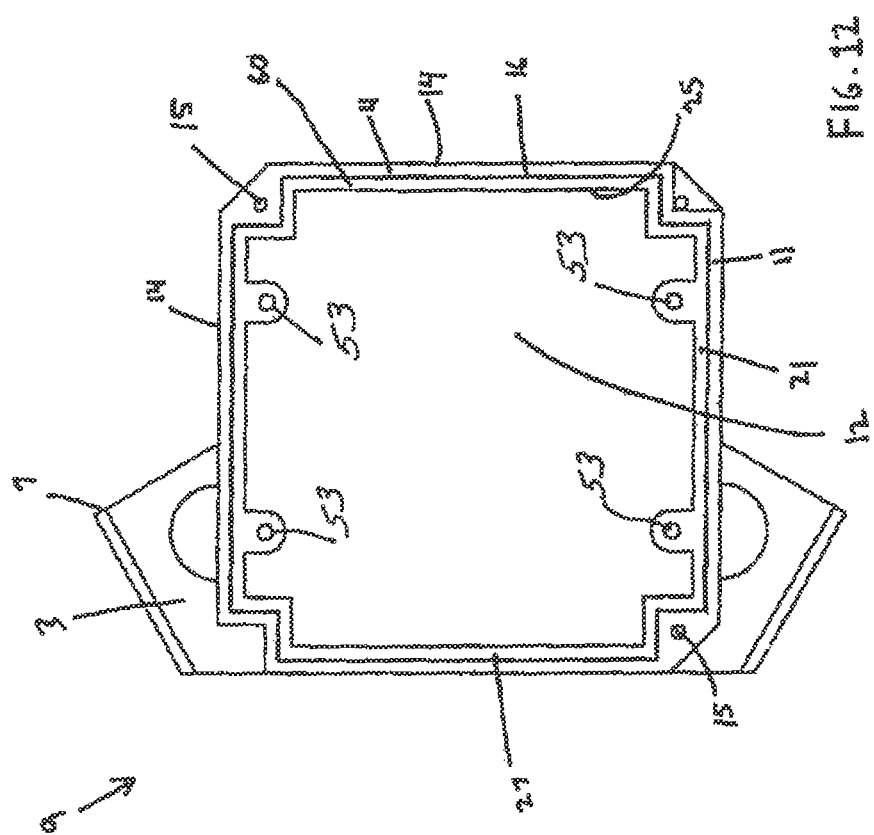

EXTENDABLE ELECTRICAL BOX

CROSS REFERENCE TO RELATED APPLICATIONS

This is a divisional application of U.S. patent application Ser. No. 12/414,609, filed Mar. 30, 2009, which application claims the benefit of U.S. provisional application Ser. No. 61/096,615, filed Sep. 12, 2008, to Shotey, et al. entitled "Extendable Electrical Box", the disclosures of which are hereby incorporated herein by reference.

BACKGROUND

1. Technical Field

Aspects of the present documents relate generally to extendable electrical boxes.

2. Background Art

Electrical boxes are conventionally used to mount and house one or more electrical devices within a wall or other structure. High voltage electrical boxes are typically required to be enclosed on all sides. During installation of electrical boxes in walls or other structures, users may find that a gap exists between the electrical box and the front surface of the wall or other structure. Various attempts have been made to address the gap that may exist between a front edge of an electrical box and a front surface of a wall or other structure.

SUMMARY

Aspects of this document relate to extendable electrical boxes.

In one aspect, an extendable electrical box comprises an electrical box having two open ends to an internal box space having a first depth. The electrical box comprises a mounting structure attached to at least one side wall of the electrical box, and the mounting structure is configured to mount the electrical box to a vertical wall structure, such that the open end faces substantially parallel to the vertical wall structure. At least two extendable first rings each continuously surround one of the two open ends of the electrical box, and the at least two extendable first rings are each slidably coupled with the electrical box via the sliding mechanical cooperation of one or more guides with one or more tracks such that sliding either of the at least two extendable first rings in relation to the open ends of the electrical box expands the electrical box from the first depth to a larger second depth.

Particular implementations may include one or more of the following. The at least two extendable first rings may each located on an outside surface of the electrical box. The at least two extendable rings may each comprise a first ring and a second ring, wherein each second ring extends in relation to and beyond a corresponding first ring. The at least two extendable first rings may be slidably located on an inside surface of the electrical box. The at least two extendable first rings may be slidably located on an outside surface of the electrical box. The electrical box may comprise at least two electrical device mounting screw holes each located on opposing corners of the electrical box. The one or more tracks may be located on an outer surface of the electrical box and the one or more guides may be located on an inner surface of the one or more extendable first rings. The one or more tracks may be located on an inner surface of the electrical box and the one or more guides are located on an outer surface of the one or more extendable first rings. The one or more tracks may pass through an outer surface of the electrical box and the one or more guides may be located on one of an inner surface and an outer surface of the one or more extendable first rings.

In another aspect, an extendable electrical box comprises an electrical box having a continuous front edge surrounding at least one open end to an internal box space having a first depth. The electrical box comprises a mounting structure attached to at least one side wall of the electrical box, the mounting structure configured to mount the electrical box to a vertical wall structure such that the open end faces substantially parallel to the vertical wall structure. One or more extendable first rings continuously surround the open end of the electrical box, the one or more extendable first rings slidably coupled with the electrical box via the sliding mechanical cooperation of one or more guides with one or more tracks such that sliding the one or more extendable first rings in relation to an open end of the electrical box expands the electrical box from the first depth to a larger second depth, wherein when the one or more extendable first rings are in a collapsed position with respect to the electrical box, a front edge of the one or more first extendable rings is substantially flush with the continuous front edge of the electrical box.

Particular implementations may include one or more of the following. The electrical box may comprise an open front end and an open back end, and wherein the one or more extendable first rings continuously surround each of the open front end and the open back end of the electrical box. The one or more extendable first rings may be located on an outside surface of the electrical box. One or more extendable second rings may each be located on an outside surface of one of the one or more extendable first rings. The one or more extendable first rings may be slidably located on an inside surface of the electrical box. The electrical box may comprise at least two electrical device mounting screw holes each located on an opposing corner of the electrical box. The one or more tracks may be located on an inner surface of the electrical box and the one or more guides may be located on an outer surface of the one or more extendable first rings. The one or more tracks may pass through an outer surface of the electrical box and the one or more guides are located on one of an inner surface and an outer surface of the one or more extendable first rings.

In still another aspect, a method of mounting an electrical box comprises mounting an electrical box to a vertical wall surface having a wall depth; and extending a depth of the electrical box by sliding an extendable ring continuously surrounding an open end of the electrical box from a first position, where a front edge of the extendable ring is substantially flush with a front edge of the open end of the electrical box, to a second position where the front edge of the extendable ring is substantially flush with a front surface of the vertical wall structure.

Particular implementations may include one or more of the following. Sliding the extendable ring may be performed without the use of tools.

The foregoing and other aspects, features, and advantages will be apparent to those having ordinary skill in the art from the DESCRIPTION and DRAWINGS, and from the CLAIMS.

BRIEF DESCRIPTION OF THE DRAWINGS

A gangable electrical unit will hereinafter be described in conjunction with the appended drawings, where like designations denote like elements, and:

FIG. 11 is a fully extended perspective view of the extendable electrical box illustrated in FIG. 9; and FIG. 12 is a collapsed front view of the extendable electrical box illustrated in FIG. 9.

DESCRIPTION

Figure 1:
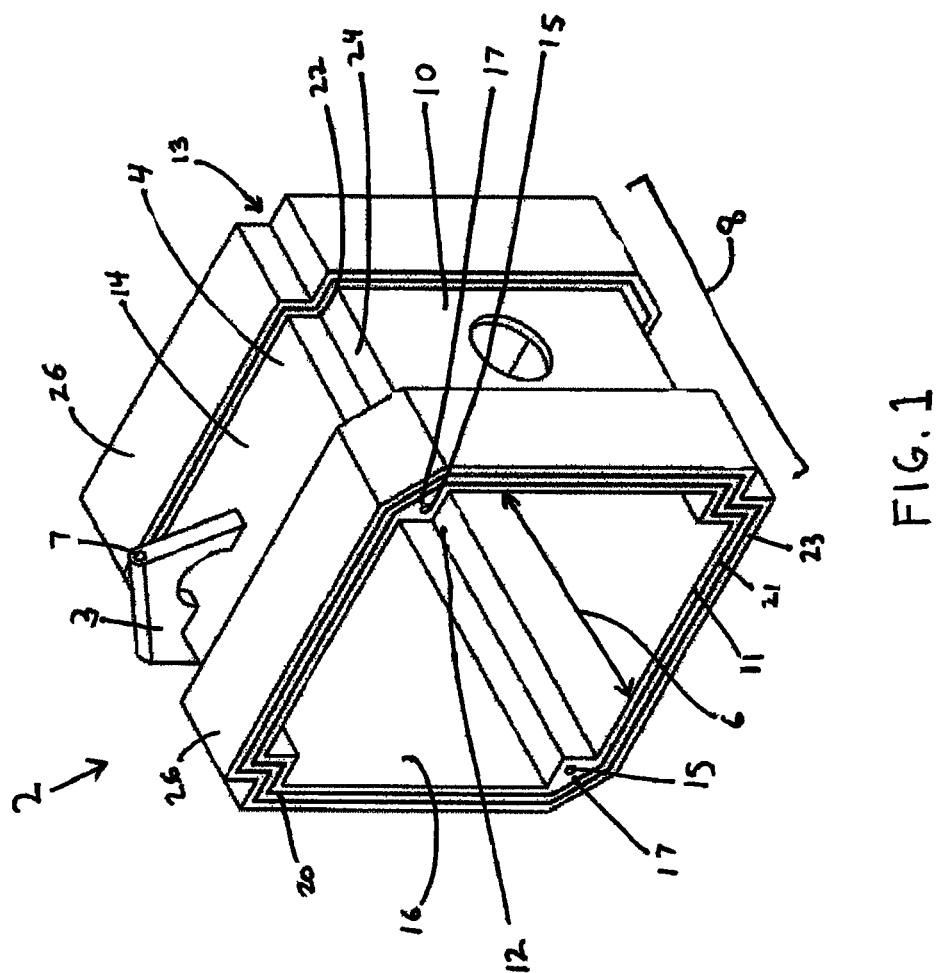
FIG. 1 is a collapsed perspective view of a first particular implementation of an extendable electrical box.
Figure 2:
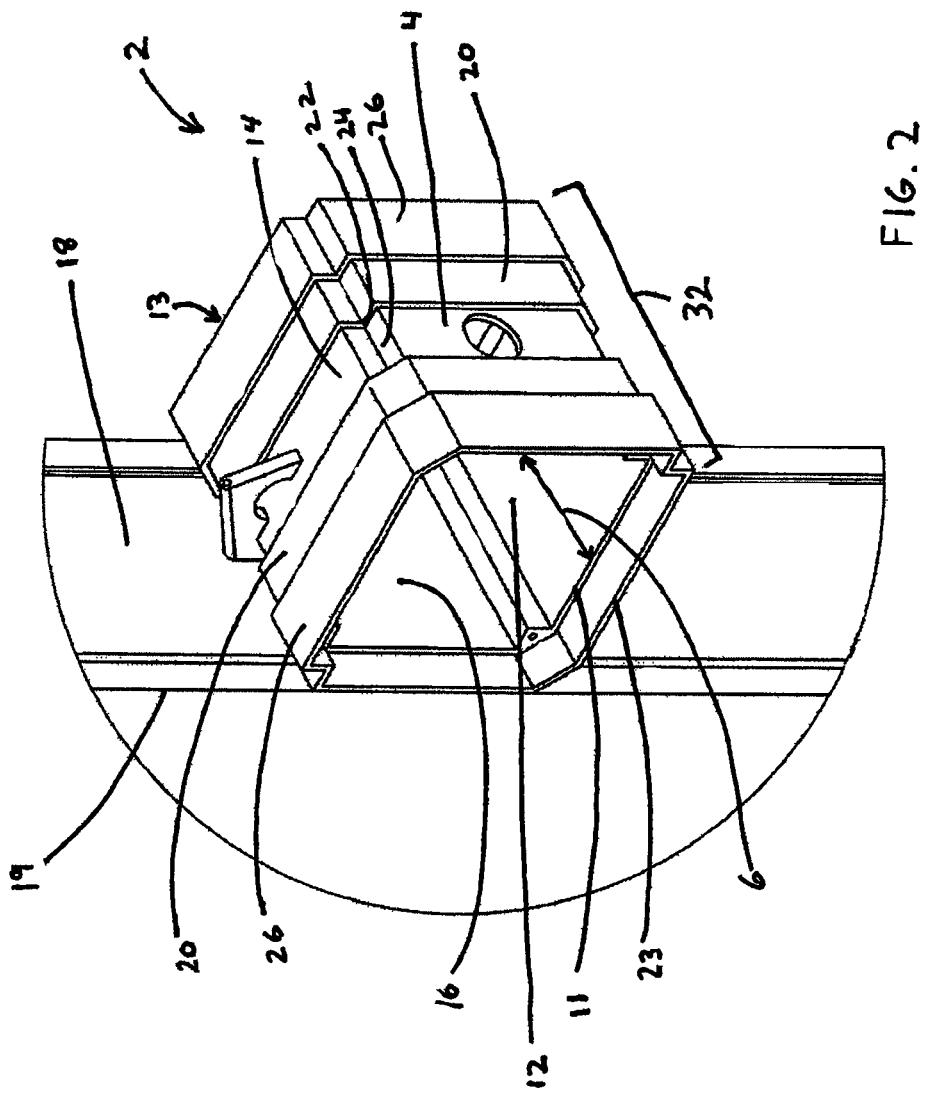
FIG. 2 is a partially extended perspective view of the extendable electrical box illustrated in FIG. 1.
Figure 3:
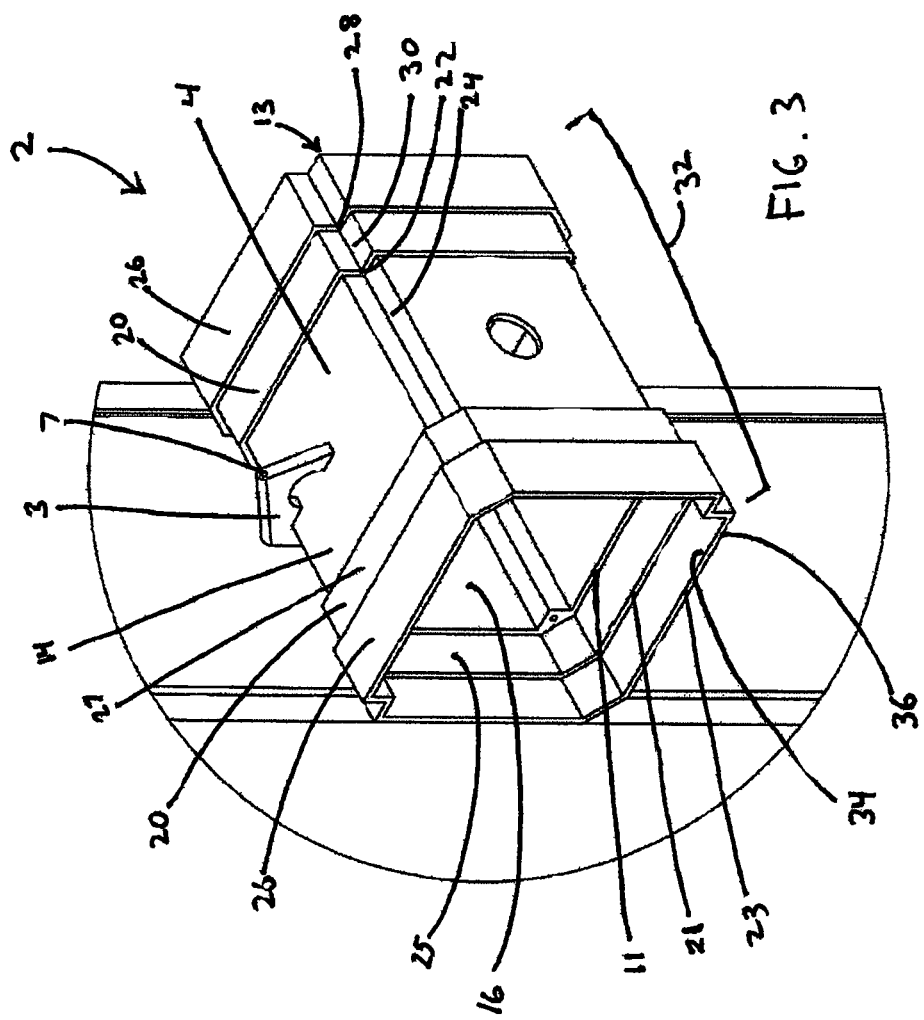
FIG. 3 is a fully extended perspective view of the extendable electrical box illustrated in FIG. 1.
Figure 4:
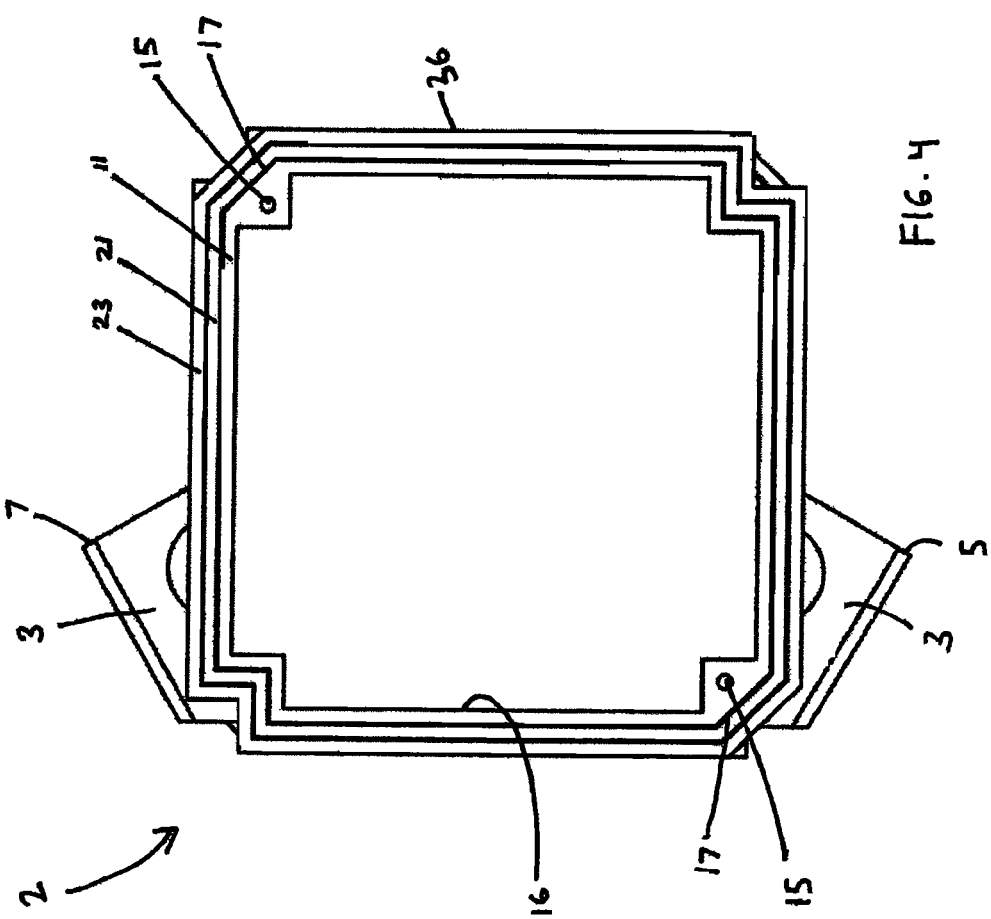
FIG. 4 is a collapsed front view of the extendable electrical box illustrated in FIG. 1.
Figure 5:
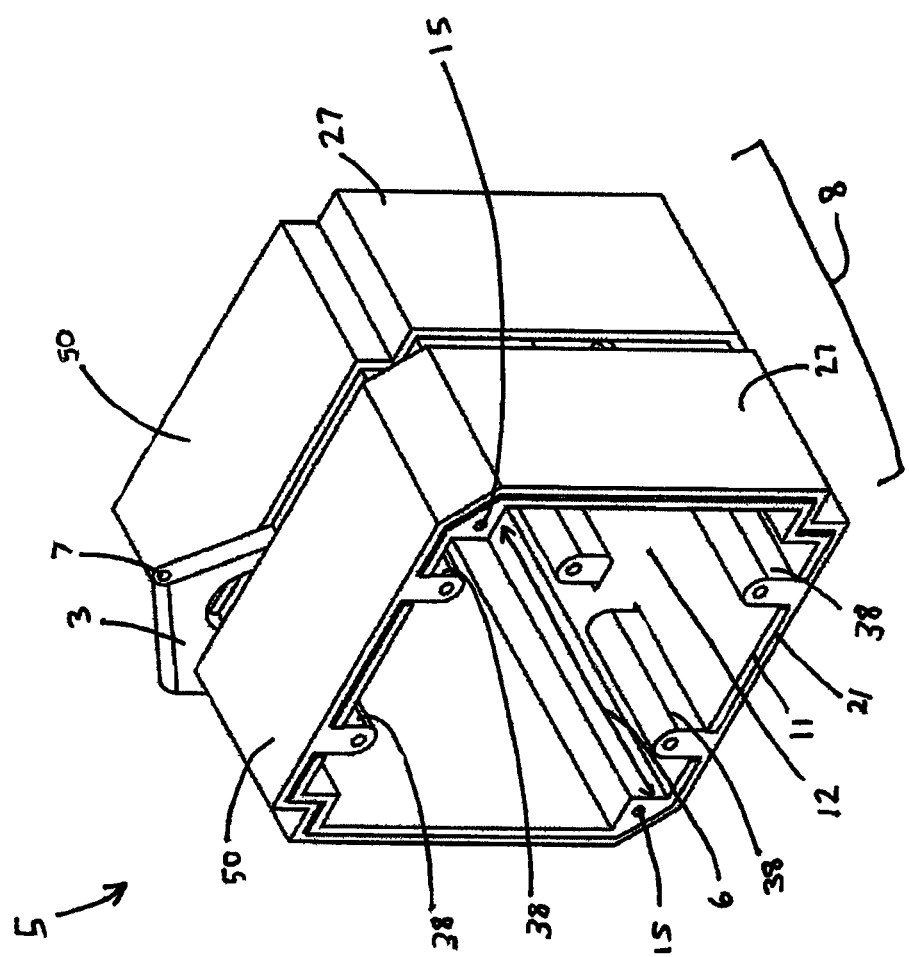
FIG. 5 is a collapsed perspective view of a second particular implementation of an extendable electrical box.

This disclosure, its aspects and implementations, are not limited to the specific components or assembly procedures disclosed herein. Many additional components and assembly procedures known in the art consistent with the intended operation of an extendable electrical box and/or assembly procedures for an extendable electrical box will become apparent from this disclosure. Accordingly, for example, although particular electrical boxes, side walls, internal spaces, depths, inner surfaces, outer surfaces, front edges, guides, tracks, grooves, extendable rings, extendable first rings, extendable second rings, open ends, mounting structures, and screw apertures are disclosed, such electrical boxes, guides, tracks, grooves, extendable rings, first rings, second rings, mounting structures, screw apertures and implementing components may comprise any shape, size, style, type, model, version, measurement, concentration, material, quantity, and/or the like as is known in the art for such extendable electrical boxes, consistent with the intended operation of an extendable electrical box.

There are a variety of extendable electrical box implementations disclosed herein and made possible from the present disclosure. FIGS. 1-4 illustrate a first particular implementation of an extendable electrical box 2, wherein the extendable electrical box 2 is shown in conjunction with a vertical wall structure 18 in FIGS. 2-3, and alone in FIGS. 1 and 4. FIGS. 5-9 illustrate a second particular implementation of an extendable electrical box 5, wherein the extendable electrical box 5 is shown in conjunction with a vertical wall structure 18 in FIGS. 6-7, and alone in FIGS. 5 and 8. FIGS. 9-12 illustrate a third particular implementation of an extendable electrical box 9, wherein the extendable electrical box 9 is shown in conjunction with a vertical wall structure 18 in FIGS. 10-11, and alone in FIGS. 9 and 12.

FIGS. 1-12 illustrate various particular implementations of extendable electrical boxes. All of the particular implementations of extendable electrical boxes described herein are used to reconfigure an electrical box 4 comprising an internal space 6 having a first depth 8 (FIGS. 1, 5 and 9, respectively) to an electrical box 4 comprising an internal space 6 having a second depth 32 (FIGS. 2-3, 6-7, and 10-11, respectively). In particular, a comparison of FIG. 1 to FIG. 3 (and/or FIGS. 5 to 7 and/or FIGS. 9 to 11) illustrates that the second depth 32 is larger than the first depth 8.

An electrical box 4 (which is common to all particular implementations of extendable electrical boxes described herein) comprises at least one side wall 10 and a front edge 11. In some particular implementations, the electrical box 4 comprises four side walls 10 which are located at the top and bottom forming first and second end walls of the electrical box 4 in addition to the sides. The electrical box 4 further comprises an open end 12 which, in the particular implementation shown, is defined by the four side walls 10. The open end 12 comprises at least two cover plate mounting screw holes 15 located on opposing angles 17 of the electrical box 4. Significantly, in some particular implementations, the electrical box 4 may comprise two open ends such as, by way of non-limiting example, a front open end 12 and a rear open end 13. In any event, the electrical box 4 further comprises a mounting structure 3 attached to at least one side wall 10. In some particular implementations, the mounting structure 3 may comprise an angled nail hole 7 therethrough. The mounting structure 3 is used to mount the electrical box 4 to a vertical wall structure 18 (FIGS. 2-3, FIGS. 6-7, and FIGS. 10-11, respectively), such that an open end 12 faces substantially parallel to the vertical wall structure 18.

Still referring to FIGS. 1-12, all of the various implementations of extendable electrical boxes described herein further comprise one or more extendable first rings 20 that continuously surround an open end 12 of the electrical box 4. The one or more extendable first rings 20 may continuously surround the open end 12 of the electrical box 4 from either the outer surface 14 (such as, by way of non-limiting example, the particular implementations shown with respect to FIGS. 1-4 and FIGS. 5-8, respectively) or the inner surface 16 of the electrical box 4 (such as, by way of non-limiting example, the particular implementation illustrated with respect to FIGS. 9-12, described further below). In any event, the one or more extendable first rings 20, 50, 60 are slidably coupled with the electrical box 4 via the sliding mechanical cooperation of one or more guides 22, 52 with one or more tracks 24, 54, which are described further below.

The one or more guides 22, 52 may comprise any projection, protrusion, bump, raised portion, angle, and/or the like and may be formed integrally or may be formed separately and thereafter coupled to the electrical box 4 and/or one or more extendable first rings 20. In the particular implementation shown with respect to FIGS. 1-4, the one or more guides 22 are integrally formed by an angle extending from the inner surface 25 of the one or more extendable first rings 20. Notwithstanding, the one or more guides 22 may be located on the one or more extendable first rings 20 and/or the electrical box 4 and may be formed in a variety of ways such as, by way of non-limiting example, an angle extending from the inner surface 16 of the electrical box 4 into the internal space 6 (such as, by way of non-limiting example, the particular implementation shown with respect to FIGS. 9-12, described further below).

In some particular implementations, the one or more guides 22, 52 may be integrally formed with or otherwise located on the outer surface 14 of the electrical box 4. In other particular implementations, the one or more guides 22, 52 may be integrally formed with the inner surface 16 of the electrical box 4 (such as, by way of non-limiting example, the particular implementation illustrated with respect to FIGS. 9-12). In still other particular implementations, the one or more guides 22, 52 may be integrally formed with or otherwise located on an outer surface 27 of the one or more extendable first rings 20, 50, 60. In yet other particular implementations, the one or more guides 22, 52 may be integrally formed with an inner surface 25 of the one or more extendable first rings 20, 50, 60 (such as, by way of non-limiting example, those particular implementations illustrated with respect to FIGS. 1-4 and FIGS. 5-8, respectively).

The one or more tracks 24, 54 may comprise any groove, channel, furrow, path and/or the like and may be formed integrally or may be formed separately and thereafter coupled to the electrical box 4 and/or one or more extendable first rings 20, 50, 60. In some particular implementations, the one or more tracks 24, 54 may be integrally formed on the outer surface 14 of the electrical box 4 (such as, by way of non-limiting example, those particular implementations illustrated with respect to FIGS. 1-4 and FIGS. 5-8, respectively). In other particular implementations, the one or more tracks 24, 54 may be integrally formed or otherwise located on the inner surface 16 of the electrical box 4. In still other particular implementations, the one or more tracks 24, 54 may be integrally formed on an outer surface 27 of the one or more extendable first rings 20, 50, 60 (such as, by way of non-limiting example, the particular implementation illustrated with respect to FIGS. 9-12). In yet other particular implementations, the one or more tracks 24, 54 may be integrally formed or otherwise located on an inner surface 25 of the one or more extendable first rings 20, 50, 60.

Still referring to FIGS. 1-12, in some particular implementations of extendable electrical box disclosed herein, the extendable electrical box may comprise one or more extendable second rings 26. In those particular implementations having one or more extendable second rings 26, the one or more extendable second rings 26 may be located on the outer surface 27 of an associated first ring 20. The one or more extendable second rings 26 comprise an inner surface 34 and an outer surface 36. In the particular implementations shown in FIGS. 1-4 and FIGS. 5-9, respectively, the inner surface 34 of the one or more extendable second rings 26 is adjacent to the outer surface 27 of its associated first ring 20. Notwithstanding, in other particular implementations, the outer surface 36 of the one or more extendable second rings 26 may be adjacent to the inner surface 25 of the one or more extendable first rings 20

With respect to any of the particular implementations of extendable electrical box described herein, the one or more extendable first rings 20, 50, 60 may be integrally formed with the electrical box 4 such that the one or more extendable first rings 20, 50, 60 do not decouple from the electrical box 4 during normal operation such as, by way of non-limiting example, when expanding and collapsing the one or more extendable first rings 20, 50, 60 with respect to the electrical box 4. Where the one or more extendable first rings 20, 50, 60 are integrally formed with the electrical box 4, the one or more extendable first rings may be integrally formed with the outer surface 14 and/or the inner surface 16 of the electrical box 4.

The one or more extendable first rings 20, 50, 60 are slidably positionable with respect to the electrical box 4 such that sliding the one or more extendable first rings 20, 50, 60 with respect to an open end 12 (the front open end 12 and/or the rear open end 13) expands the extendable electrical box from a first depth 8 (FIGS. 1 and 4, FIGS. 5 and 8; and FIGS. 9 and 12, respectively) to a larger second depth 32 (FIGS. 2-3, FIGS. 6-7, and FIGS. 10-11, respectively). It will be appreciated from a comparison of FIG. 2 to FIG. 3 (and/or a comparison of FIG. 6 to FIG. 7 and/or a comparison of FIG. 10 to FIG. 11) that the larger second depth 32 may comprise a variety of depths, all of which is larger than the first depth 8. In those particular implementations of electrical box 4 having an open front end 12 and an open rear end 13, the one or more extendable first rings 20, 50, 60 may continuously surround each of the open front end 12 and the open rear end 13. It will be understood that an electrical device (not shown) will typically be installed in an open end 12 of the electrical box 4 via one or more electrical device mounting apertures 42 (which may be integrally formed with or located on one or more extendable first rings 20 and/or one or more extendable second rings 26 such as, by way of non-limiting example, in the particular implementation shown with respect to FIGS. 5-8). In addition, a cover plate (not shown) is typically installed over an electrical device and coupled to an electrical box 4 (such as, by way of non-limiting example, one or more cover plate mounting screw holes 15).

In those particular implementations of extendable electrical box having both an open front end 12 and an open rear end 13, an electrical device may be installed in each of the front open end 12 and the rear open end 13. Notwithstanding, in those instances where one of a front open end 12 and a rear open end 13 are unused (i.e. no electrical device is installed therein), the unused front open end 12 and/or the unused rear open end 13 may be covered by fastening a cover plate over the open end of the electrical box 4 via the one or more cover plate mounting holes 15.

Referring still to FIGS. 1-12, the electrical box 4 comprises a box front edge 11. In addition, the one or more extendable first rings 20, 50, 60 each comprise a first ring front edge 21. When the one or more extendable first rings 20 is in a collapsed position with respect to the electrical box 4 (FIGS. 1 and 4; 5 and 8; and 9 and 12, respectively), the first ring front edge 21 is substantially flush with the box front edge 11 of the electrical box 4. Alternatively, when the one or more extendable first rings 20 is in an expanded position with respect to the electrical box 4 (FIGS. 2-3, 6-7, and 10-11, respectively), the first ring front edge 21 may be substantially flush with a front surface 19 of the vertical wall structure 18. In those particular implementations where one or more extendable second rings 26 are provided, each of the one or more extendable second rings 26 may comprise a second ring front edge 23. When the one or more extendable second rings 26 is in a collapsed position with respect to the electrical box 4 and its associated extendable first ring 20 (FIGS. 1 and 4; and 5 and 8, respectively), the second ring front edge 23 is substantially flush with both the box front edge 11 of the electrical box 4 and the first ring front edge 21 of the associated extendable first ring 20, 50, 60. Alternatively, when the one or more extendable second rings 26 is in an expanded position with respect to the electrical box 4 and its associated first ring 20 (FIGS. 2-3, and FIGS. 6-7, respectively), the second ring front edge 23 may be substantially flush with a front surface 19 of the vertical wall structure 18.

In addition, the one or more extendable first rings 20 and the one or more extendable second rings 26 may move independently, both with respect to each other, as well as with respect to the electrical box 4. Also, it will be understood that where one or more extendable second rings 26 are provided, each of the one or more extendable second rings 26 are slidably coupled with an associated extendable first ring 20 via the sliding mechanical cooperation of one or more guides with one or more tracks. By way of non-limiting example, the one or more extendable second rings 26 may comprise one or more guides 28 (which may be located on or may be integral with the inner surface 34 and/or the outer surface 36 of second ring 26) that cooperate with one or more tracks 30 (FIG. 3) on an associated extendable first ring 20 (which may be located on or may be integral with the inner surface 25 and/or the outer surface 27 of the associated first ring 20). Alternatively, the one or more extendable second rings 26 may comprise one or more tracks 30 (which may be located on or may be integral with the inner surface 34 and/or the outer surface 36 of second ring 26) that cooperate with one or more guides 28 on an associated extendable first ring 20 (which may be located on or may be integral with the inner surface 25 and/or the outer surface 27 of the associate first ring 20).

As described above, the one or more extendable first rings 20, 50, 60 and/or the one or more extendable second rings 26 (where provided) may be maintained in an extended position with respect to the electrical box 4. In particular implementations, such as, by way of non-limiting example, those illustrated with respect to FIGS. 1-4 and 5-8, respectively, the one or more extendable second rings 26 may be maintained in an extended position (FIGS. 2-3, and FIGS. 6-7, respectively) due at least to the fact that the outer surface 36 of the one or more extendable second rings 26 extends above the outer surface 14 of the electrical box 4. Specifically, when the electrical box 4 (FIGS. 1-4 and 5-8) is mounted to a vertical wall structure 18, an outer surface 36 of the one or more extendable second rings 26 is in contact with the vertical wall structure 18. The resulting contact between the vertical wall structure 18 and the outer surface 36 of the one or more extendable second rings 26 accordingly assists in maintaining the one or more extendable second rings 26 in an extended position with respect to the electrical box 4. Significantly, the one or more extendable second rings 26 may be maintained in a collapsed position with respect to the electrical box 4 by friction between a first ring 20, 50, 60, a second ring 26 and/or the electrical box 4 (and/or friction between an outer surface 36 of a second ring 26 and/or an outer surface 27 of a first ring 20). Alternatively, in some particular implementations, a detenting feature (not shown) may be provided in order to assist in maintaining the one or more extendable second rings 26 (and/or the one or more extendable first rings 20) in an extended and/or a collapsed position with respect to the electrical box 4.

It will be understood that, in those particular implementations having one or more extendable second rings 26, the one or more extendable first rings 20 may be maintained in an extended position or a collapsed position due at least to their mechanical cooperation with the one or more extendable second rings 26. It will be further understood that, in those particular implementations without one or more extendable second rings 26, the outer surface 27 of the one or more extendable first rings 20 may be in contact with the vertical wall structure 18, thereby assisting in maintaining the one or more extendable first rings 20 in an extended position with respect to the electrical box 4.

Figure 6:
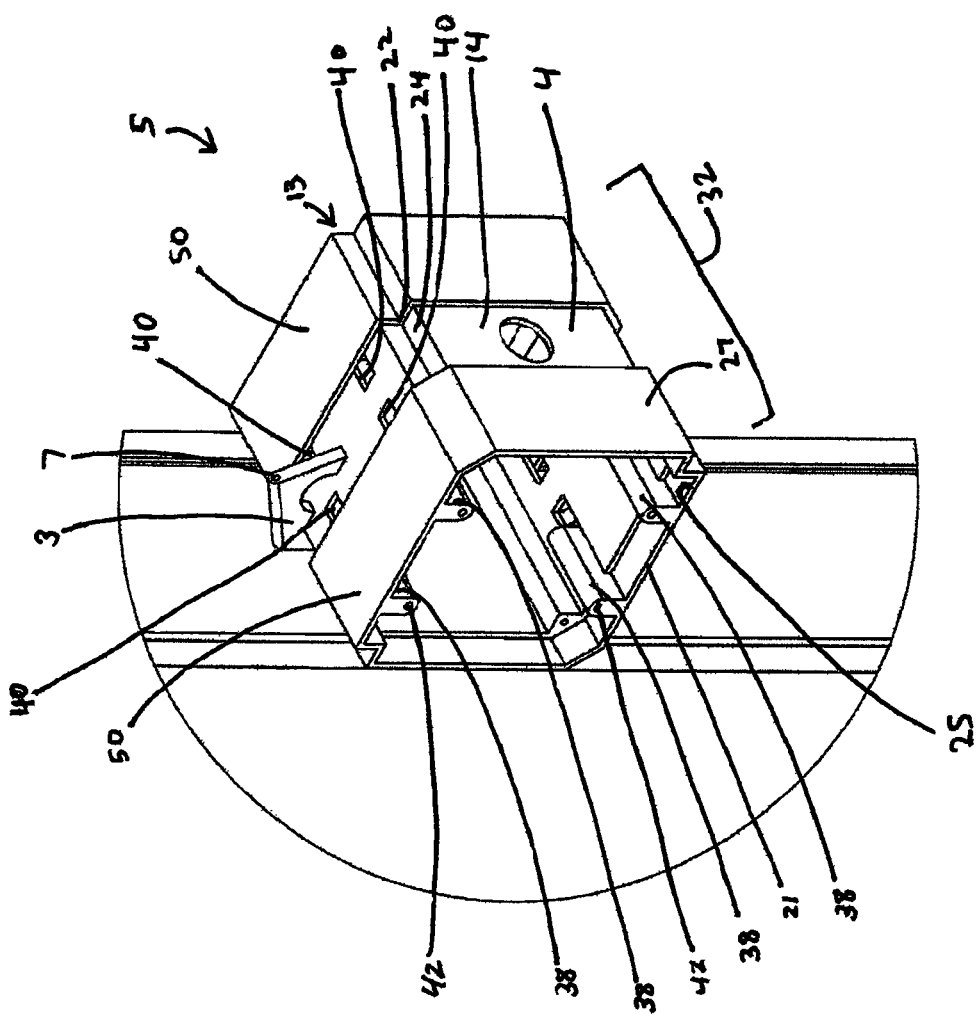
FIG. 6 is a partially extended perspective view of the extendable electrical box illustrated in FIG. 5.
Figure 7:
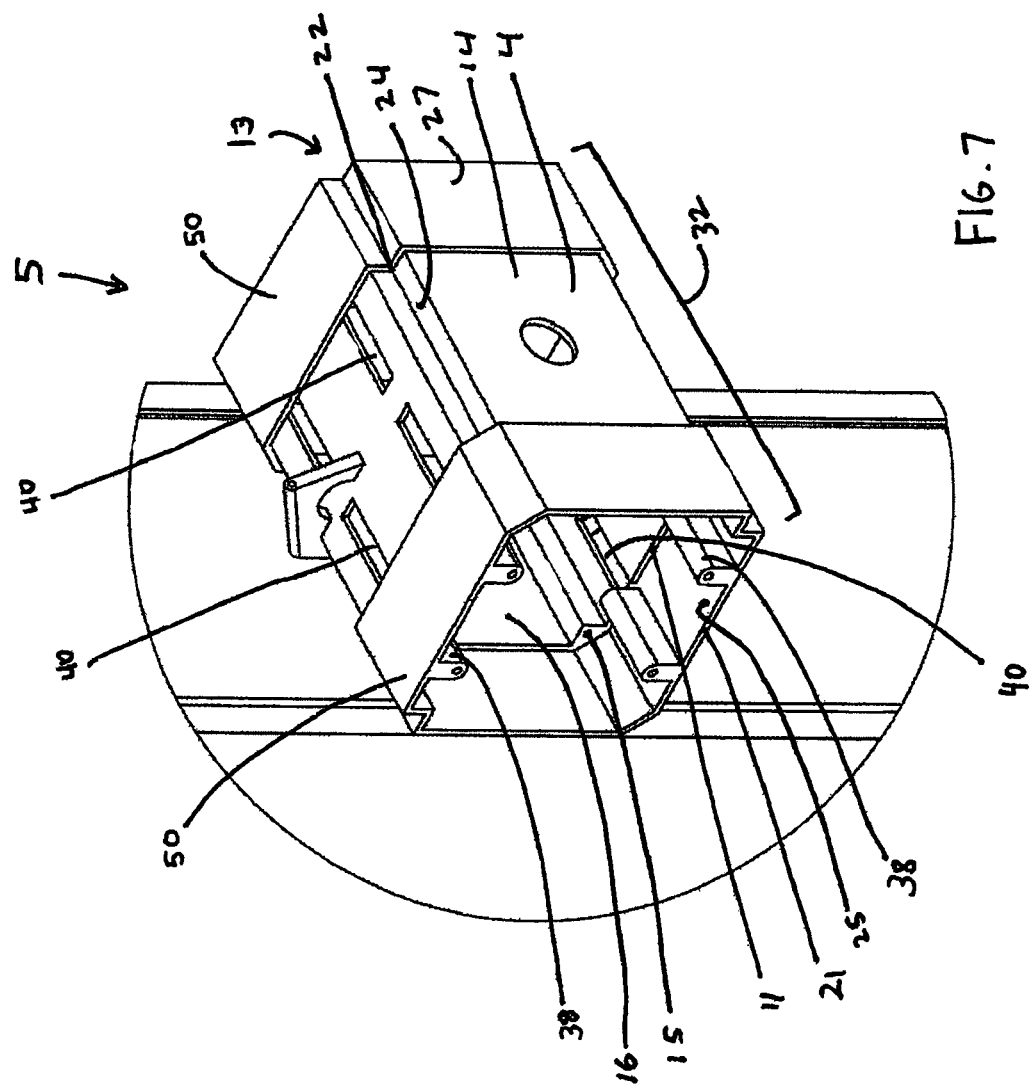
FIG. 7 is a fully extended perspective view of the extendable electrical box illustrated in FIG. 5.
Figure 8:
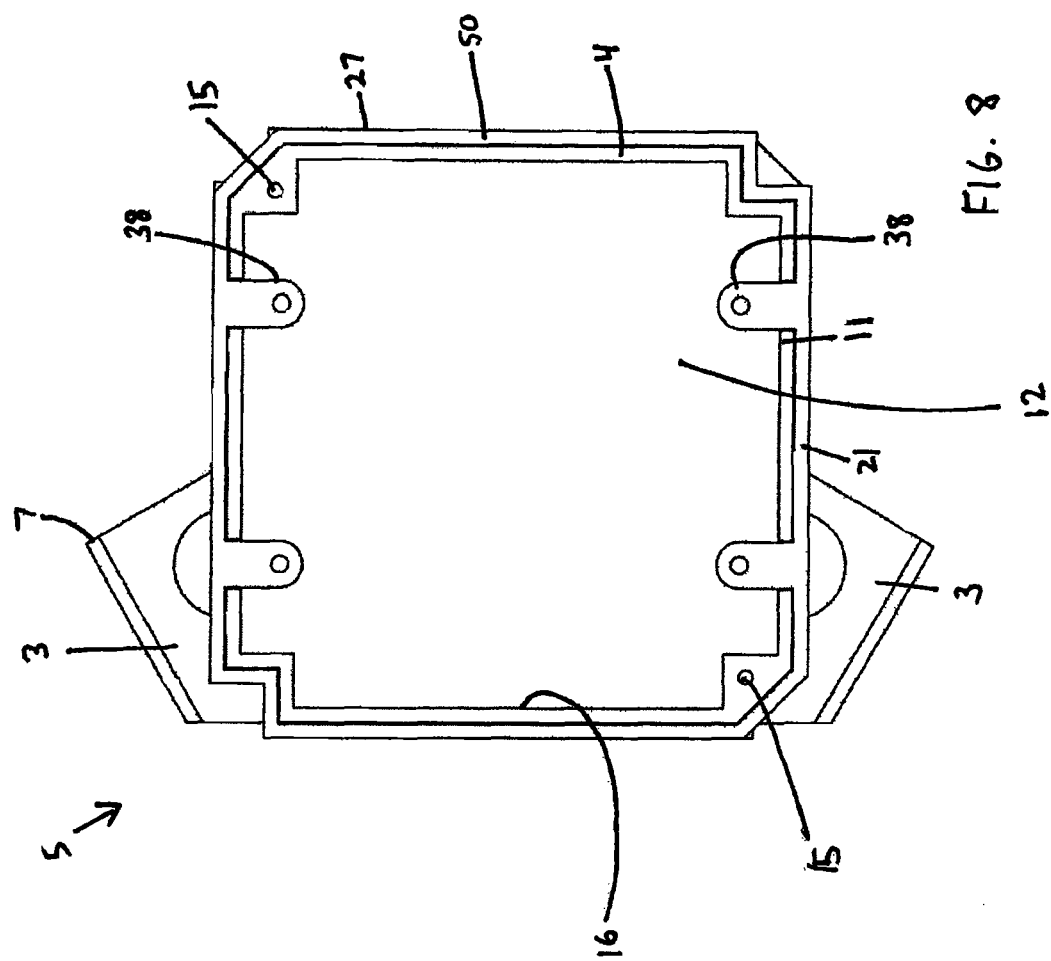
FIG. 8 is a collapsed front view of the extendable electrical box illustrated in FIG. 5.
Figure 9:
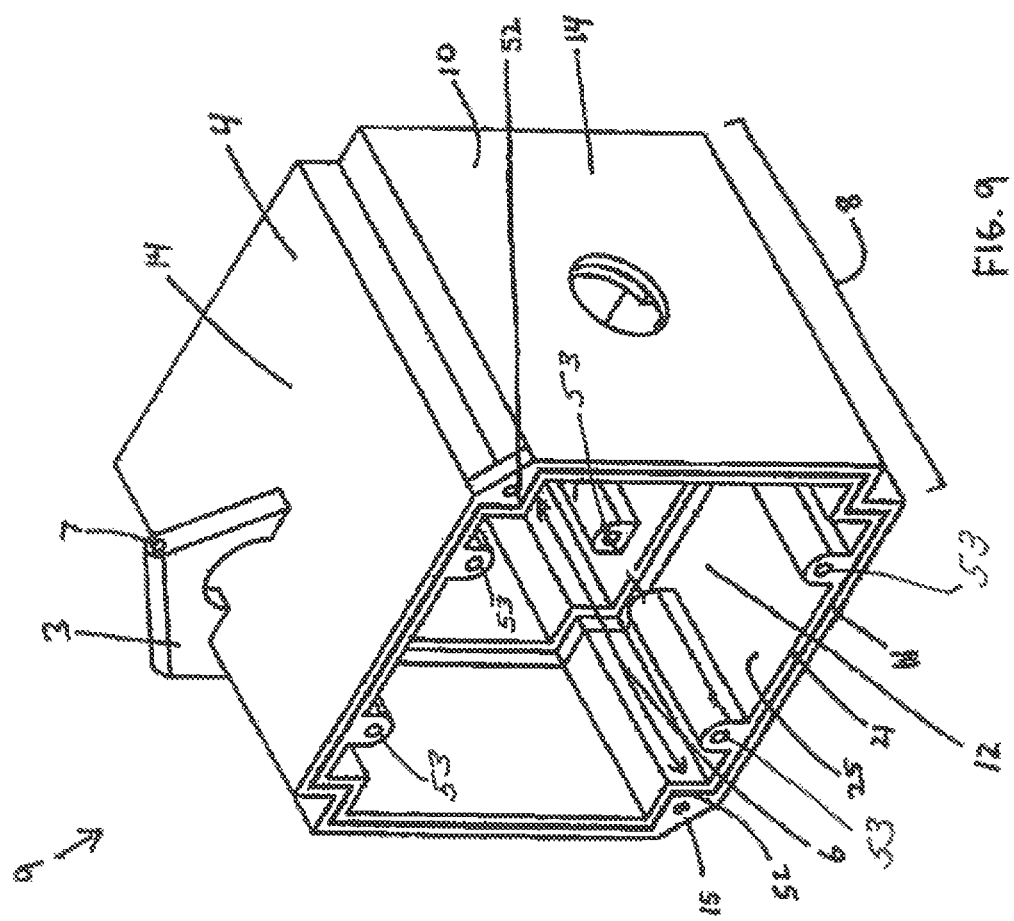
FIG. 9 is a collapsed perspective view of a third particular implementation of an extendable electrical box.
Figure 10:
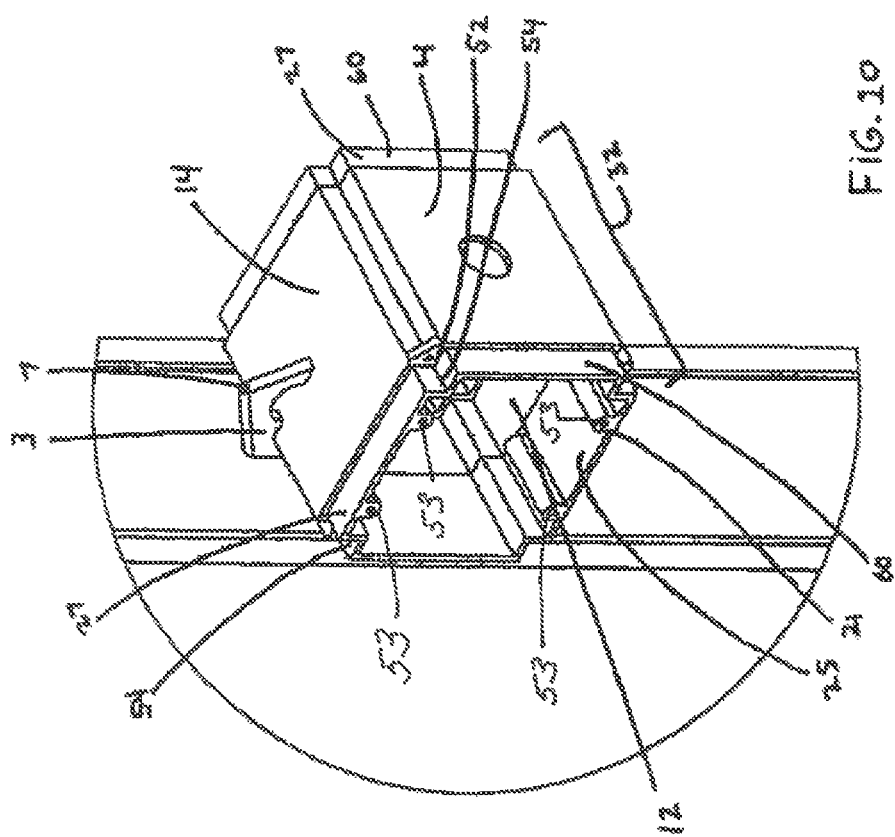
FIG. 10 is a partially extended perspective view of the extendable electrical box illustrated in FIG. 9.

Turning now specifically to FIGS. 5-8, these figures illustrate a second particular implementation of an extendable electrical box 5. The extendable electrical box 5 is shown in conjunction with a vertical wall structure 18 in FIGS. 6-7, and alone in FIGS. 5 and 8. A comparison of FIGS. 5-8 to FIGS. 1-4 illustrates that the extendable electrical box 5 further comprises one or more auxiliary guides 38 and one or more auxiliary tracks 40. In the particular implementation shown, the one or more auxiliary tracks 40 pass through the electrical box 4 from the outer surface 14 to the inner surface 16. The one or more auxiliary guides 38 are integrally formed with (although, in particular implementations, they may be located on) the inner surface 25 of the one or more extendable first rings 50. In any event, the one or more auxiliary guides 38 travel in the one or more auxiliary tracks 40 as the one or more extendable first rings 50 are moved between a collapsed position (FIG. 5) and an expanded position (FIGS. 6-7). In the particular implementation shown, each auxiliary guide 38 comprises an integrally formed electrical device mounting aperture 42. In other particular implementations, one or more electrical device mounting aperture 42 may be integrally formed with (or located on) a portion of one or more extendable first rings 50 and/or one or more extendable second rings 26.

Referring specifically to FIGS. 9-12, these figures illustrate a third particular implementation of an extendable electrical box 9. The extendable electrical box 9 is shown in conjunction with a vertical wall structure 18 in FIGS. 10-11, and alone in FIGS. 9 and 12. A comparison of FIGS. 9-12 to FIGS. 1-4 illustrates that the one or more extendable first rings 60 may be located in the internal space 6 of the electrical box 4. In this particular implementation, the outer surface 27 of the one or more extendable first rings 60 is in contact with the inner surface 16 of the electrical box 4. As shown in FIGS. 9-12, ring 60 includes screw holes 53. In addition, in this particular implementation, the one or more guides 52 are integrally formed with the inner surface 16 of the electrical box, and the one or more tracks 24, 54 are integrally formed with the outer surface 27 of the extendable first ring 20. Notwithstanding, alternatively, the particular location of the one or more guides 22 and the one or more tracks 24, 54 may be changed such that the one or more tracks 24, 54 may be integrally formed with (or located on) the inner surface 16 of the electrical box, and the one or more guides 22 may be integrally formed with (or located on) the outer surface 27 of the extendable first ring 20. In addition, while the particular implementation of extendable electrical box 9 shown and described with respect to FIGS. 9-12 is shown without one or more extendable second rings 26, one or more extendable second rings 26 could be provided, in particular implementations. In such particular implementations, the outer surface 36 of one or more extendable second rings 26 may be adjacent to the inner surface 25 of the one or more extendable first rings 60.

Methods of Use

Referring to FIGS. 1-12, an exemplary method of mounting an extendable electrical box comprises mounting an electrical box 4 to vertical wall structure 18 such that an open end 12 faces substantially parallel to the vertical wall structure 18. In some particular implementations, the electrical box 4 may be mounted to the wall 18 via one or more mounting structures 3 (comprising one or more angled nail holes 7) formed integrally with, or located on, an outer surface 14 of the electrical box 4. Once mounted, an undesirable gap may exist between the front edge 11 of the electrical box 4 and the front surface of the wall structure 18.

Accordingly, the exemplary method further comprises extending a depth 8 of the electrical box 4 by sliding an extendable ring (one or more extendable first rings 20, 50, 60 and/or one or more extendable second rings 26) from a first position to a second position. The first position specifically comprises where the front edge 21 of the first ring 20, 50, 60 (and/or the front edge 23 of the second ring 26) is substantially flush with the front edge 11 of the electrical box 4 (as shown, by way of non-limiting example, with respect to FIG. 1, FIG. 5, and FIG. 9, respectively). The second position, by contrast, comprises where the front edge 21 of the first ring 20, 50, 60 (and/or the front edge 23 of the second ring 26) is substantially flush with a front surface 19 of the vertical wall structure 18. It will be appreciated, therefore, that by sliding the front edge 21 of the first ring 20, 50, 60 (and/or the front edge 23 of the second ring 26, where provided) into a second position that is substantially flush with a front surface 19 of the vertical wall structure 18, the undesirable gap between the front surface 19 of the wall and the front edge 11 of the electrical box 4 may be eliminated.

Significantly, in some particular implementations, mounting the electrical box 4 may comprise first installing an electrical device in one of one or more extendable first rings 20, 50, 60 and one or more extendable second rings 26. In other particular implementations, one of one or more extendable first rings 20, 50, 60 and one or more extendable second rings 26 may be slid with respect to the electrical box 4 without the requirement of tools.

It will be understood by those of ordinary skill in the art that the concepts of extending a depth of an extendable electrical box, as disclosed herein, is not limited to the specific implementations shown herein. For example, it is specifically contemplated that the components included in a particular implementation of a configurable electrical box may be formed of any of many different types of materials or combinations that can readily be formed into shaped objects and that are consistent with the intended operation of an extendable electrical box. For example, the components may be formed of rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, the electrical boxes, side walls, internal spaces, depths, inner surfaces, outer surfaces, front edges, guides, tracks, grooves, extendable rings, extendable first rings, extendable second rings, open ends, mounting structures, screw apertures, and any other components forming a particular implementation of an extendable electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

It will be understood that particular implementations are not limited to the specific components disclosed herein, as virtually any components consistent with the intended operation of a method and/or system implementation for an extendable electrical box may be utilized. Accordingly, for example, although particular electrical boxes, side walls, internal spaces, depths, inner surfaces, outer surfaces, front edges, guides, tracks, grooves, extendable rings, extendable first rings, extendable second rings, open ends, mounting structures, and screw apertures may be disclosed, such components may comprise any shape, size, style, type, model, version, class, grade, measurement, concentration, material, weight, quantity, and/or the like consistent with the intended operation of extendable electrical box and a method and/or system implementation for an extendable electrical box may be used.

In places where the description above refers to particular implementations of an extendable electrical box, it should be readily apparent that a number of modifications may be made without departing from the spirit thereof and that these implementations may be applied to other extendable electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An extendable electrical box comprising:
an electrical box comprising four walls including a first end wall, a first side wall, a second end wall and a second side wall, a first open end, a second open end opposite said first open end, an internal box space extending from said first open end to said second open end and having a first depth, a mounting structure integrally formed with at least one of said walls, the mounting structure configured to mount the electrical box to a vertical wall structure, a first guide projecting into said internal box space from a first corner between said first end wall and first side wall and extending from said first open end, and a second guide projecting into said internal box space from a second corner opposite said first corner between said second end wall and second side wall and extending from said first open end, said first guide having a first face extending from said first end wall, and a second face extending from said first side wall substantially perpendicular to said first face of said first guide; and
an extendable first ring having a first open end and a second open end, said extendable first ring being slidably mounted in the internal box space of said electrical box, said extendable first ring having an outer surface with an inwardly angled first track at a first corner of said first ring extending between a first open end and a second open end receiving said first guide of the electrical box, an inwardly angled second track at a second corner of said first ring opposite said first corner and extending between a first open end and a second open end receiving said second guide, and a screw hole on two opposing walls of said extendable first ring for receiving a mounting screw and supporting an electrical device at said first open end of said first ring, said first track of said first ring having a first face extending substantially perpendicular from a first end wall of said first ring and a second face extending substantially perpendicular from a first side wall of said first ring defining a longitudinal recess receiving said first guide.

2. The electrical box of claim 1, wherein,
said first face of said first guide extends substantially perpendicular to said first end wall, and
said second face of said first guide extends substantially perpendicular to said first side wall and substantially perpendicular to said first face.

3. The electrical box of claim 1, further comprising
an extendable second ring slidably received in said second open end of said electrical box, said second ring having a first end wall, a first side wall, a first open end and a second open end, and an inwardly angled first track at a first corner between said first end wall and said first side wall and extending between said open ends of said second ring, said first track of said second ring receiving said first guide of said electrical box.

4. The electrical box of claim 1, wherein
said second guide projects into said internal box space opposite said first guide, said second guide projecting from a corner between said second end wall and said second side wall.

5. The electrical box of claim 4, wherein
said first guide and second guide define a channel on an outer surface of said electrical box.

6. The electrical box of claim 5, further comprising
an extendable second ring having a first open end and a second open end; and
said second ring having a first track configured for mating with said first guide, and a second track configured for mating with said second guide, said second ring being slidably received in said second open end of said electrical box and being slidable from a retracted position to an extended position.

7. The electrical box of claim 6, wherein
said first open end of said electrical box has a screw hole spaced outwardly from said first ring configured for receiving a screw of a cover for closing said first open end.

8. An extendable electrical box comprising:
an electrical box having a continuous front edge surrounding a first open end and a continuous rear edge surrounding a second open end opposite said first open end, an internal box space having a first depth, the electrical box comprising a first wall, a second wall, a third wall and a fourth wall, a first guide projecting inwardly from an inner surface of said electrical box into a box cavity and oriented at a first corner between said first wall and said second wall, said first guide defining a first longitudinal recessed channel on an outer surface of said electrical box, said first longitudinal channel extending between said first open end and said second open end, a second guide projecting inwardly from the inner surface of the electrical box into the box cavity and oriented at a second corner between said third wall and said fourth wall and extending between the first and second open ends, said second guide defining a second longitudinal recessed channel on the outer surface of the electrical box and extending between said first open end and said second open end of said electrical box, said first guide and second guide having a longitudinal dimension extending between the first and second open ends of said electrical box, a first screw hole on an outer surface at said first corner and a second screw boss hole on an outer surface at a second corner for mounting a cover plate to said electrical box;
an extendable first ring slidably received in said first open end of said electrical box, said first ring having an outer surface with an inwardly angled recessed first track at a first corner of said first ring adapted to mate with the first guide, and an inwardly angled second track at a second corner of said first ring opposite said first corner adapted to mate with the second guide, the first ring slidably coupled with the electrical box such that sliding the extendable first rings in relation to the open end of the electrical box expands the electrical box from the first depth to a larger second depth;
an extendable second ring slidably received in said second open end of said electrical box, said second ring having an outer surface with an inwardly angled first track at a first corner configured to mate with said first guide of said electrical box, and an inwardly angled second track at a second corner opposite said first corner configured to mate with the second guide of the electrical box;
a screw hole on said first ring for supporting an electrical device at said first open end of said first ring; and
wherein a front edge of the first ring is substantially flush with the continuous front edge of the electrical box when said first extendable ring is in a retracted position with respect to the electrical box.

9. The electrical box of claim 8, wherein
said first track on said first and second rings define a first recessed channel extending between said open ends of said first and second rings, and
said second track on said first and second rings define a second recessed channel extending between said first and second open ends of said first and second rings.

10. The electrical box of claim 8, wherein
said first guide has a first face extending inwardly from said first wall substantially perpendicular to said first wall, and a second face extending inwardly from said second wall and substantially perpendicular to said second wall; and
said second guide has a first face extending inwardly from said third wall substantially perpendicular to said third wall and a second face extending inwardly from said fourth wall substantially perpendicular to said fourth wall, and
where said first track and second track have an internal shape complementing the shape of the first guide and second guide.

11. The electrical box of claim 10, wherein
said first track has a first face extending inwardly from a first wall of said first ring substantially perpendicular to said first wall of said first ring and a second face extending inwardly from a second wall of said first ring substantially perpendicular to said second wall, and
said second track has a first face extending inwardly from a third wall of said first ring substantially perpendicular to said third wall of said first ring and a second face extending inwardly from a fourth wall of said first ring substantially perpendicular to said fourth wall.

12. An extendable electrical box comprising:
an electrical box having a continuous front edge surrounding a first open end and a continuous rear edge surrounding a second open end opposite said first open end, an internal box space having a first depth, the electrical box comprising a first wall, a second wall, a third wall and a fourth wall, a first guide on an inner surface of said electrical box at a first corner between said first wall and said second wall, said first guide projecting into said internal box space and having a longitudinal dimension extending between said first and second open ends, and a second guide on an inner surface of said electrical box at a second corner between said third wall and said fourth wall, said second guide projecting into said internal box space and having a longitudinal dimension extending between said first and second open ends;
an extendable first ring slidably received in said first open end of said electrical box, said first ring having an inwardly angled recessed track on an outer surface at a first corner between a first wall and a second wall of said first ring and configured to mate with the first guide, and a second inwardly angled recessed track on an outer surface at a second corner between a third wall and a fourth wall of said second ring and configured to mate with said second guide, and where a front edge of said first ring is substantially flush with continuous front edge of the electrical box when said first ring is in a retracted position with respect to said electrical box; and an extendable second ring received in said second open end of said electrical box, said second ring having an inwardly angled recessed first track on an outer surface at a corner between a first wall and a second wall of said second ring and configured to mate with the first guide of said electrical box, and an inwardly angled second track on an outer surface at a corner between a third wall and a fourth wall of said second ring and configured to mate with the second guide of the electrical box.

13. The electrical box of claim 12, wherein said first track has a first face extending inwardly from a first wall of said first ring substantially perpendicular to said first wall of said first ring and a second face extending inwardly from a second wall of said first ring substantially perpendicular to said second wall, and said second track has a first face extending inwardly from a third wall of said first ring substantially perpendicular to said third wall of said first ring and a second face extending inwardly from a fourth wall of said first ring substantially perpendicular to said fourth wall.

* * * * *